(12) United States Patent
Murayama et al.

(10) Patent No.: US 7,557,856 B2
(45) Date of Patent: Jul. 7, 2009

(54) ELECTRONIC APPARATUS HAVING SHOOTING DEVICE AND MANUAL FOCUS SWITCH RING THAT IS ENGAGED WITH SHOOTING DEVICE HOLDER IN HOUSING

(75) Inventors: Kazunori Murayama, Kawasaki (JP); Takashi Suzuki, Kawasaki (JP); Tomoyuki Nagamine, Kawasaki (JP); Manabu Hongo, Kawasaki (JP); Haruyoshi Yada, Kawasaki (JP); Yoshiya Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 453 days.

(21) Appl. No.: 11/362,333

(22) Filed: Feb. 27, 2006

(65) Prior Publication Data
US 2007/0121000 A1   May 31, 2007

(30) Foreign Application Priority Data
Nov. 30, 2005  (JP) .............................. 2005-347248

(51) Int. Cl.
*H04N 5/232* (2006.01)
*G03B 13/00* (2006.01)
*H04N 5/225* (2006.01)

(52) U.S. Cl. ..................... 348/345; 348/340; 348/357

(58) Field of Classification Search ................. 348/340, 348/343–345, 357, 374–375; 359/19, 355, 359/440, 611, 673–675, 805; 396/71, 73, 396/76, 79, 83, 298, 343–349, 382, 444
See application file for complete search history.

(56) References Cited

U.S. PATENT DOCUMENTS

| | | | |
|---|---|---|---|
| 4,110,005 A * | 8/1978 | Bohm et al. ................. 359/673 |
| 6,067,421 A * | 5/2000 | Kitazawa et al. ............. 396/133 |
| 7,345,706 B2 * | 3/2008 | Kanayama et al. .......... 348/353 |
| 2002/0041334 A1 * | 4/2002 | Okawara ..................... 348/335 |
| 2005/0264673 A1 * | 12/2005 | Kuchimaru ................. 348/335 |

FOREIGN PATENT DOCUMENTS

| | | |
|---|---|---|
| JP | 2005-189414 | 7/2005 |
| JP | 2005-218119 | 8/2005 |
| JP | 2005-277643 | 10/2005 |

* cited by examiner

*Primary Examiner*—David L Ometz
*Assistant Examiner*—Kelly L Jerabek
(74) *Attorney, Agent, or Firm*—Kratz, Quintos & Hanson, LLP

(57) ABSTRACT

An electronic apparatus includes a shooting device, a housing and a switch ring rotatably engaged with and fixed onto said housing, wherein when said switch ring is rotated, a focal point for photography of said shooting device is manually switched.

5 Claims, 5 Drawing Sheets

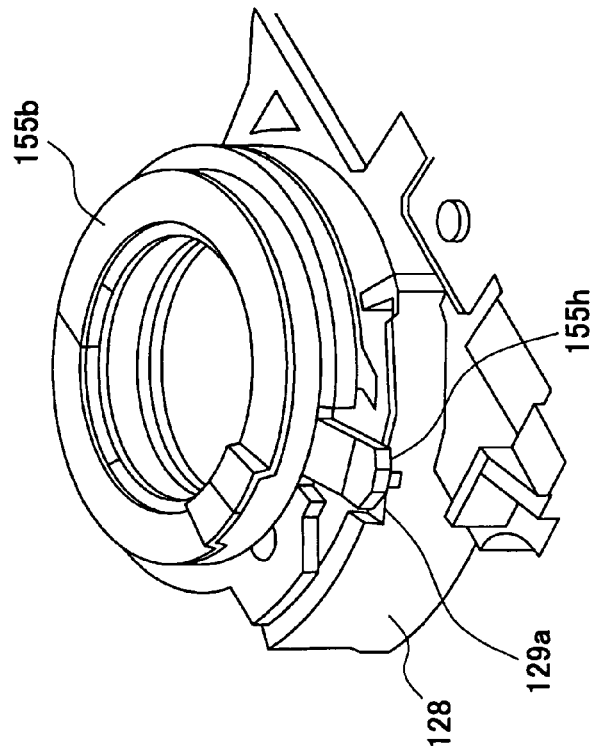
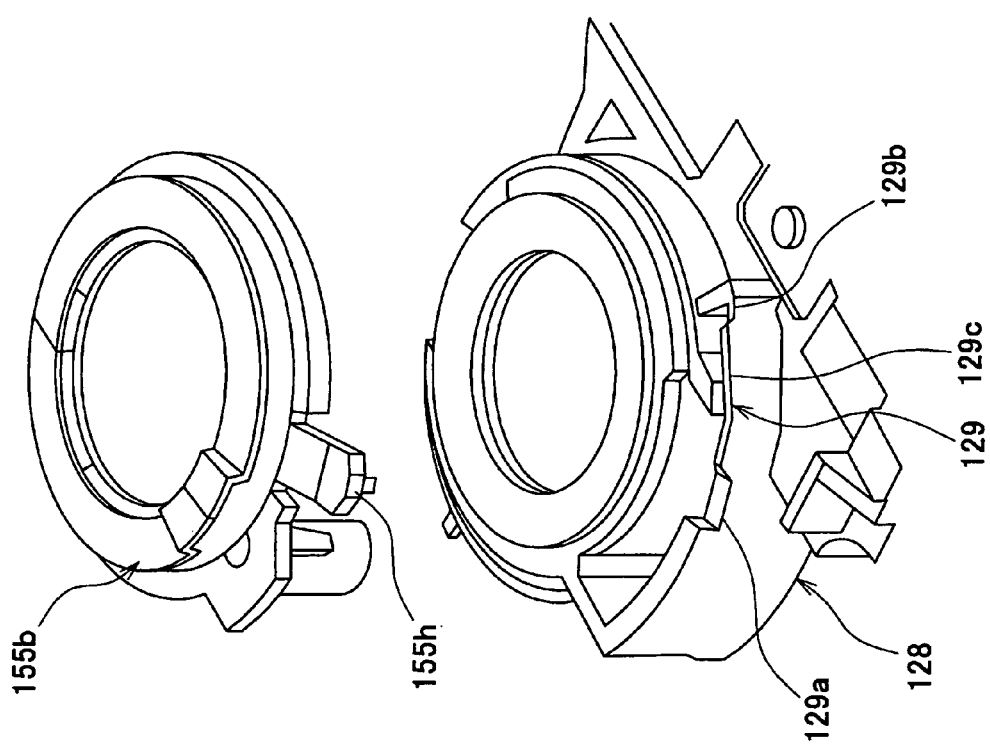
FIG. 4B
FIG. 4A

PRIOR ART

ELECTRONIC APPARATUS HAVING SHOOTING DEVICE AND MANUAL FOCUS SWITCH RING THAT IS ENGAGED WITH SHOOTING DEVICE HOLDER IN HOUSING

This application claims the right of foreign priority under 35 U.S.C. §119 based on Japanese Patent Application No. 2005-347248, filed on Nov. 30, 2005, which is hereby incorporated by reference herein in its entirety as if fully set forth herein.

BACKGROUND OF THE INVENTION

The present invention relates generally to an electronic apparatus having a shooting device, and more particularly to an apparatus that enables a focal point of the shooting device to be manually switched (which is also referred to as a "macro switching apparatus"). The present invention is suitable, for example, for a rotatable macro switching apparatus for a shooting device which is mounted onto a foldable cell phone (including a personal digital cellular ("PDC"), a personal handy phone system ("PHS"), and another mobile communication terminal, which are generally referred to as "mobile radio communication apparatuses").

Along with recent widespread of the mobile radio communication apparatuses, various demands have been made on them including versatility, the reduced number of component, and an improved operability.

From the versatility aspect, a cell phone having a shooting device is proposed (see, for example, Japanese Patent Application, Publication ("JP") No. 2005-218119). In addition, a focus switching mechanism that manually changes a focal point position of the shooting device by rotating a switch ring attached to a housing of the cell phone (see, for example, JP No. 2005-218119).

FIG. 5 is a partially sectional view around a housing 3 of a shooting device 4 in JP No. 2005-218119. A switch ring 1 is rotatably fixed onto the housing 3 via a cover 6. A shooting device panel 2 is provided as a transmission window between the switch ring 1 and a case 3, and protects a lens (not shown) in the shooting device 4 held by a holder 5. The switch ring 1 has a projection (not shown) engageable with a flat spring 7. The projection is engaged with the flat spring 7 at two focal point positions. When the projection becomes engaged with the flat sprint 7, a user can obtain a click sense or sound, confirming a switch of the photographing mode.

Other prior art include JP Nos. 2005-277643 and 2005-189414.

JP No. 2005-218119 arranges the cover 6 that fixes the switch ring 1 on the housing 3, and needs the flat spring 7 that provides the click sense when the focal point is changed by the switch ring 1, thus requiring many components. In addition, in JP No. 2005-218119, the switch ring 1 projects from the housing 3, as shown in FIG. 5, and the shooting device is likely to be caught. Therefore, the operability is insufficient, because this configuration causes a drop of the cell phone 100, a damage of a shooting device due to pressure, and a breakdown of the shooting device panel 155b.

BRIEF SUMMARY OF THE INVENTION

Accordingly, it is an exemplified object of the present invention to provide an electronic apparatus having a shooting device and a macro switching apparatus that reduces the number of components and improves operability.

An electronic apparatus according to one aspect of the present invention includes a shooting device, a housing and a switch ring rotatably engaged with and fixed onto the housing, wherein when the switch ring is rotated, a focal point for photography of the shooting device is manually switched. According to the electronic apparatus, switch ring is engaged with and fixed onto the housing, and supersedes the cover that fixes the switch ring, thereby reducing the number of components.

A top surface of the switch ring is preferably as high as a top surface of the housing. The operability improves by preventing the switch ring from projecting. The electronic apparatus may further include a holder fixed, as a separate member from the housing, in the housing, and a shooting device panel that is held between the switch ring and the holder, and protects a lens of the shooting device. While JP No. 2005-218119 arranges the shooting device panel on the housing and the shooting device panel and the switch ring that covers it are likely to project from the housing, this inventive configuration prevents the projection by holding the shooting device panel with the holder that is a separate member from the housing and improves the operability. For example, the electronic apparatus is a movable radio communication apparatus, and the holder holds the shooting device and an antenna for the movable radio communication apparatus.

An electronic apparatus according to another aspect of the present invention includes a shooting device, a housing, a holder that is fixed, as a separate member from the housing, in the housing, and at least partially holds the shooting device, a switch ring that enables a focal point for photography of the shooting device to be manually switched when the switch ring is rotated; and a clicking unit that uses an engagement between the switch ring and the holder, and provides a click sense at two rotating positions of the switch ring, which correspond to two focal point positions. According to the electronic apparatus, the clicking unit utilizes the engagement between the switch ring and the holder, and supersedes the flat spring as in JP No. 2005-218119. Therefore, the number of components reduces.

The clicking unit includes, for example, an elastic member that is provided at one of the switch ring and the holder, and deformable between a first position and a second position, the elastic member being located at the first position when the switch ring is located at one of the two rotating positions, and the elastic member being located at the second position when the switch ring is located between the two rotating positions, and a cam member that is provided at the other of the switch ring and the holder, contacts the elastic member, and deforms the elastic member between the first and second positions.

The elastic member and the switch ring may be made of the same resin material and integrated with each other. The cam member and the holder may be made of the same resin material and integrated with each other. Thereby, the number of components reduces rather than configuring them as separate members.

Other objects and further features of the present invention will become readily apparent from the following description of preferred embodiments with reference to the accompanying drawings.

BRIEF DESCRIPTION OF THE DRAWINGS

FIGS. 4A and 4B are views for explaining one example of a click means applicable to the shooting device shown in FIG. 3A.

DETAILED DESCRIPTION OF THE PREFERRED EMBODIMENTS

Figure 1:
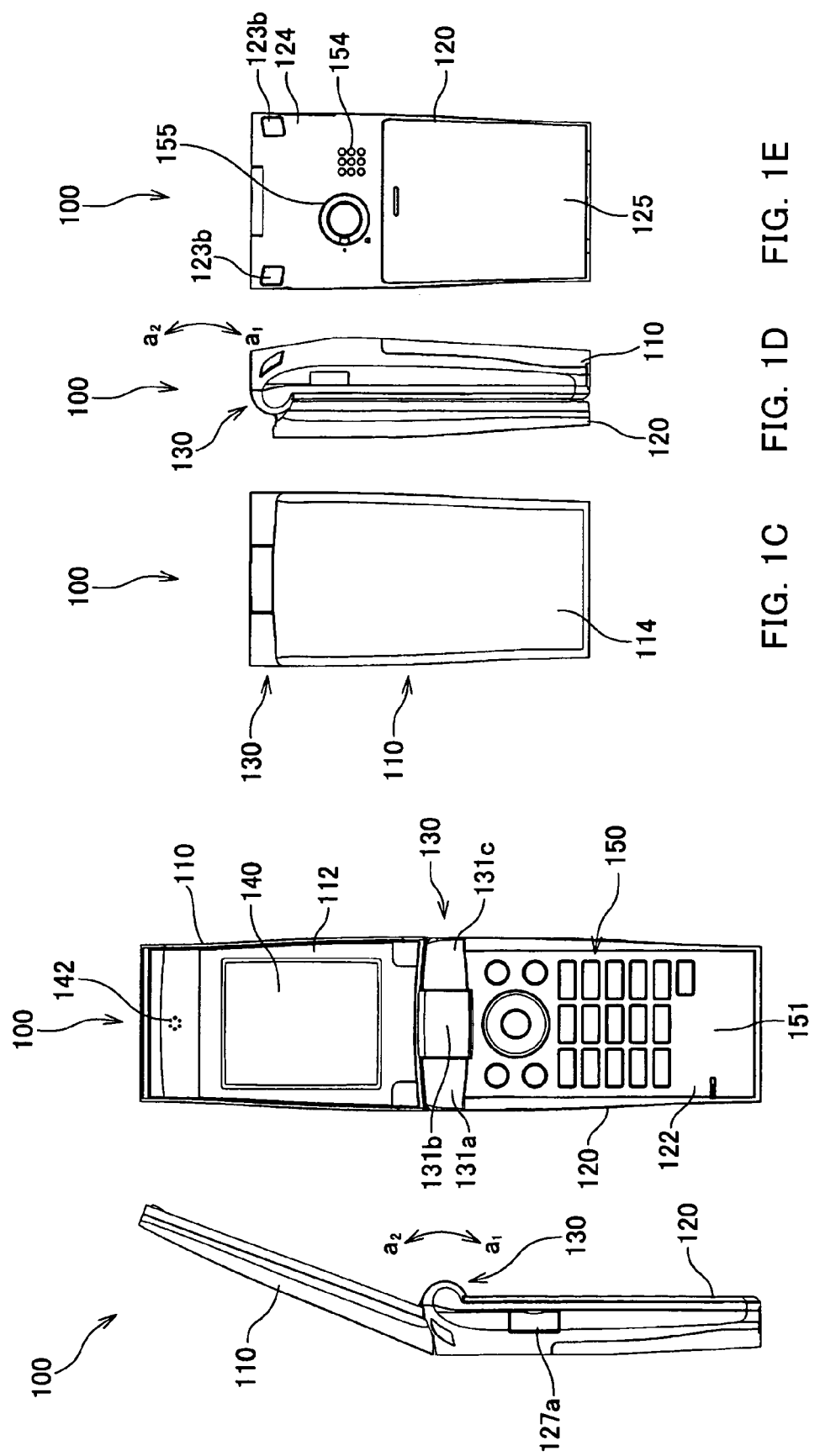
FIGS. 1A and 1B are side and front views when a cell phone as an inventive foldable information processing apparatus opens.
FIG. 1C-1E are top, side and rear views when the cell phone closes.
Figure 2:
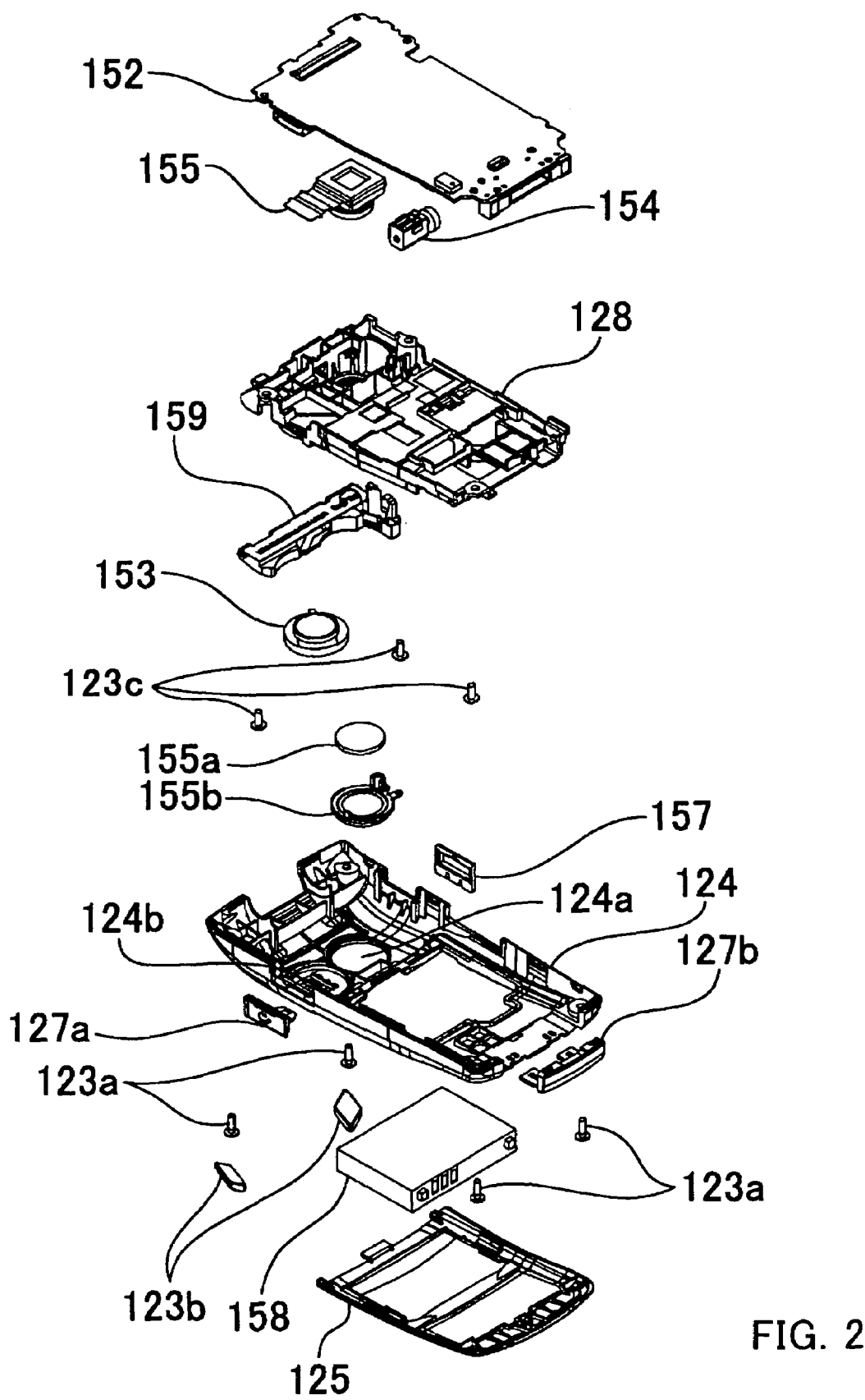
FIG. 2 is a partially exploded perspective view of the cell phone shown in FIGS. 1A-1E.

A description will be given of a cell phone 100 as one example of an inventive electronic apparatus, with reference to the accompanying drawings. Here, FIG. 1A is a left side view of the opening cell phone 100. FIG. 1B is a front view of the opening cell phone 100. FIG. 1C is a top view of the closed cell phone 100. FIG. 1D is a left side view of the closed cell phone 100. FIG. 1E is a rear view of the closed cell phone. FIG. 2 is a partially exploded perspective view of a fixed-side housing 120 of the cell phone 100.

The cell phone 100 is a foldable cell phone that foldably couples the movable-side housing 110 to the fixed-side housing 120 via a hinge part 130, and the movable-side housing 110 is configured to be rotatable relative to the fixed-side housing 120. A user can fold the movable-side housing 110 onto the fixed-side housing 120 as shown in FIG. 1D during a non-use period of the cell phone 100 by rotating the movable-side housing 110 in $a_1$ direction in FIG. 1A. In addition, before using, the user opens the movable-side housing 110 from the fixed-side housing 120, as shown in FIG. 1A, by rotating the folded movable-side housing 110 in $a_2$ direction shown in FIG. 1D.

The movable-side housing 110 has a housing structure that couples a front case 112 to a rear case 114, as shown in FIGS. 1B and 1C, installs an LCD holder (or movable-side chassis) 116, and houses a variety components, such as a display 140, and a receiver 142.

The display 140 includes an LCD module that displays communication information, such as transmission information, reception information, address book information, information input by an operating part 150, and various functional information. The LCD module is held by the magnesium alloy LCD holder (movable-side chassis) 116. The receiver 142 outputs voices of a communicatee.

The fixed-side housing 120 also has a housing structure that couples a front case 122 to a rear case 124, as shown in FIGS. 1A, 1B and 1E. As shown in FIG. 2, the fixed-side housing 110 installs a key case (fixed-side chassis) 126 and a holder 128, and houses a variety components, such as the operating part 150, the printed board 152, a speaker 153, a vibrator 154, a shooting device 155, an IrDa panel 157, a battery 158, and an antenna 159.

The front case 122 and the rear case 124 are formed, for example, by injection molding using ABS resin. Both are combined with each other by screws 123a, and each screw 123a is covered by a PET screw cap 123b and a rear cover 125. The rear case 124 is detachably coupled with the rear cover 125.

The operating part 150 has a pad and a flexible module, and the pad is mounted with a track-ball type operating section, and a ten-key type operating section. The operating part 150 inputs communication information. Information is input from the pad, and the flexible module serves as a switch. The operating part 150 is held by a magnesium alloy key case and a front case 122.

The printed board 152 processes information input from the operation part 150, transmission and reception information, and other information, and transmits the information to the display 140. A microphone (not shown) through which a user speaks during calls is attached to the printed board 152. The printed board 152 is held by the ABS holder 128 and key case.

The printed board 152 has a terminal to which an earphone is connected, and a connection terminal with an external apparatus, such as a personal computer ("PC"), and these terminals are covered by rubber covers 127a and 127b attached to the rear case 124.

The speaker 153 outputs an incoming call sound, and is attached to an opening 124b in the rear case 124. The vibrator 154 transmits the incoming call through vibrations to the user instead of the sound.

The shooting device 155 is a module that takes both still and motion pictures. The macro switch ring 155b switches between a normal photographing mode and a zooming mode (or a focal point), and is attached to an opening 124a in the rear case 124. The acrylic out shooting device panel 155a is inserted into the ABS macro switch ring 155b, and protects a lens.

Figure 3B:
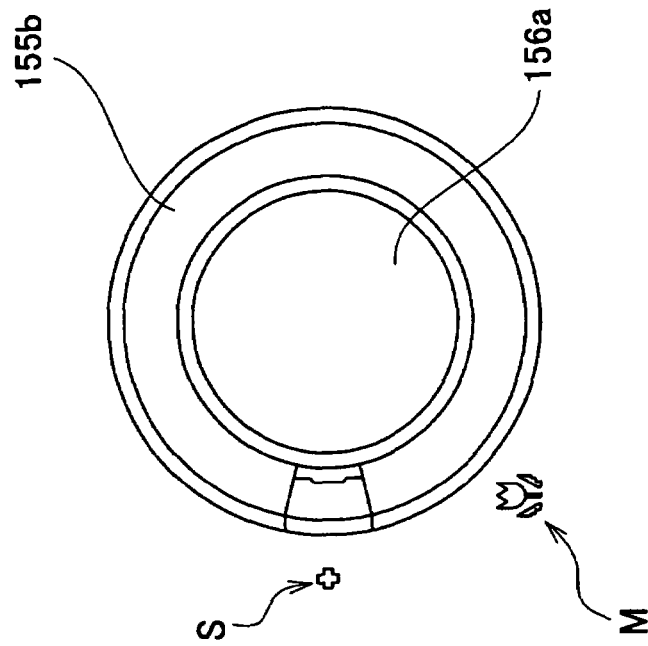
FIGS. 3A and 3B are partially enlarged sectional and plane views near the shooting device shown in FIG. 1D.
Figure 3A:
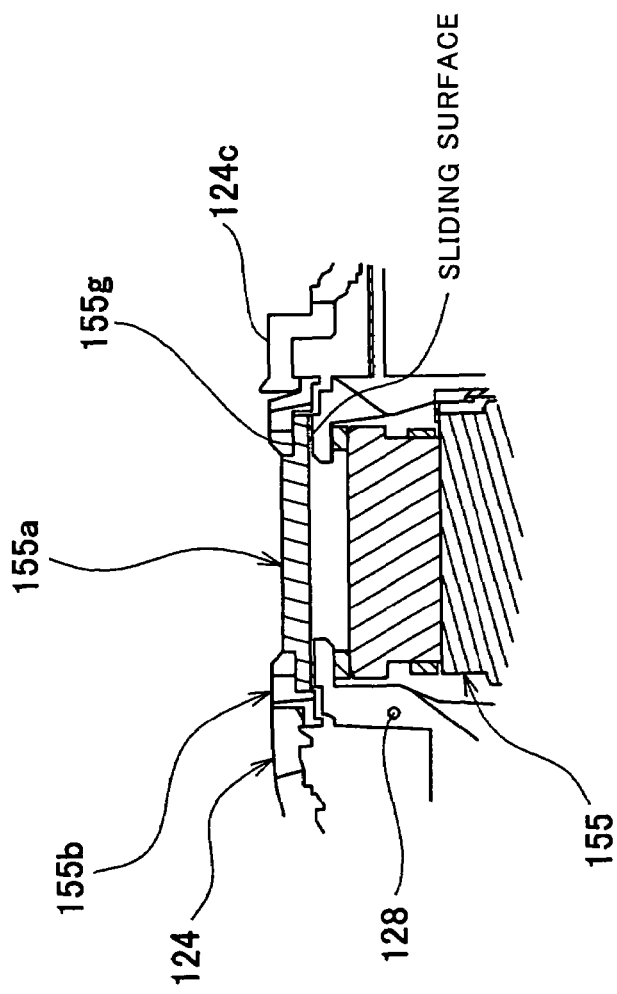

FIG. 3A is a partially sectional view near the macro switch ring 155b in the shooting device 155. FIG. 3B is an enlarged plane view near the macro switch ring 155b of the rear case 124 shown in FIG. 1E.

Figure 5:
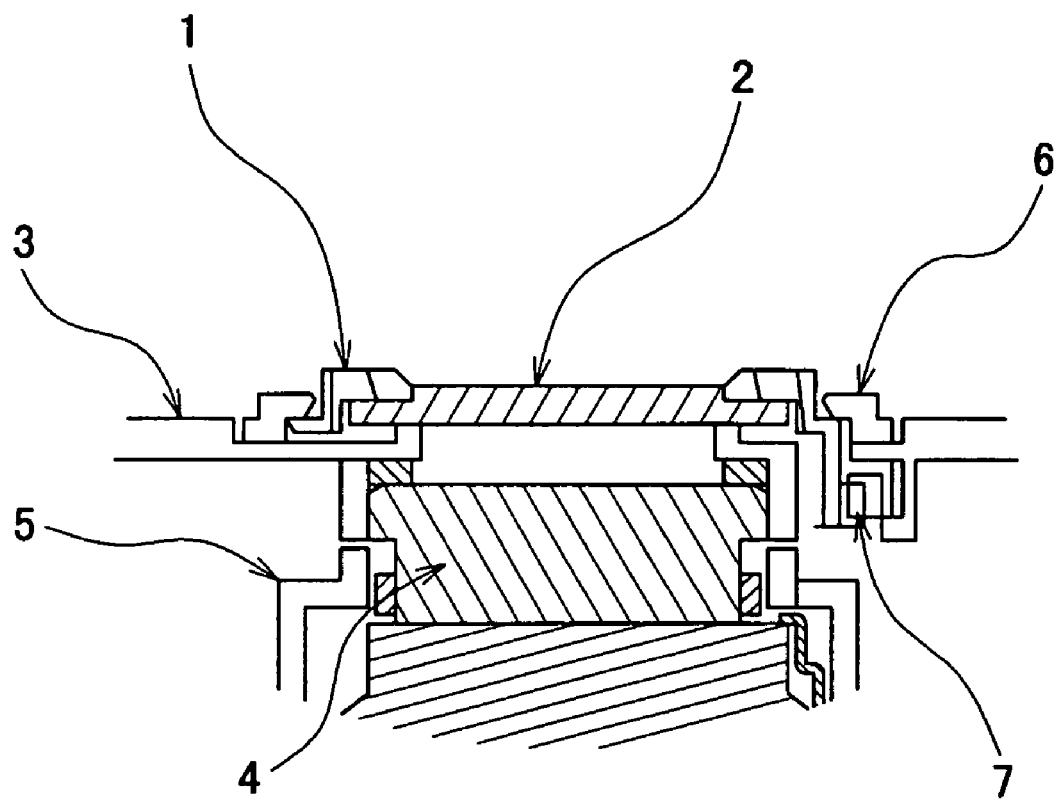
FIG. 5 is a partially sectional view near the conventional shooting device's housing.

The switch ring 155b is rotatably engaged with and fixed onto the rear case 124 by a nail (not shown) of the switch ring, etc. The rear case 124 has a function of and supersedes the cover 6 shown in FIG. 5, thereby reducing the number of components. The rear case 124 serves as a positioning presser. The switch ring 155b is rotatable, as shown in FIG. 3B, between a standard position S and a macro position M that correspond to two focal point positions.

As shown in FIG. 3A, a top surface 155g of the switch ring 155b is as high as a top surface 124c of the rear case 124. Consequently, as shown in FIG. 1D, the surface of the rear case 124 is flat, unlike the switch ring 1 projecting from the housing 3 in the prior art shown in FIG. 5. Therefore, the operability improves by preventing a drop of the cell phone 100, a damage of a shooting device due to pressure, and a breakdown of the shooting device panel 155b.

The holder 128 holds the shooting device 155 and the antenna 159. The holder 128 is fixed, as a separate member from the rear case 124, in the fixed-side housing 120. The shooting device panel 155b is held between the switch ring 155b and the holder 128, as shown in FIG. 3A. The prior art shown in FIG. 5 arranges the shooting device panel 2 on the housing 3, and the shooting device panel 2 and the switch ring 1 that covers it are likely to project from the housing 3. On the other hand, this embodiment holds the shooting device panel 155b by using the holder 128 that is a separate member from the rear case 124, preventing the above projection, and improving the operability.

The shooting device 155 further includes a clicking means that utilizes an engagement between the switch ring 155b and the holder 128, and provides a click sense at two rotating positions S and M of the switch ring 155b, which correspond to the two focal point positions. The click means utilizes an engagement the switch ring 155b and the holder 128, and supersedes the flat spring 7 in the prior art shown in FIG. 5, thereby reducing the number of components.

FIGS. 4A and 4B show one example of the clicking means. Here, FIG. 4A is a partially exploded perspective view in which the macro switch ring 155b is removed from the holder 128, and omits the shooting device panel 155a. FIG. 4B is a partially perspective view of the holder 128 to which the macro switch ring 155b is attached.

The clicking means shown in FIGS. 4A and 4B includes a resin spring 155h and a cam member 129. The resin spring 155h is provided to the switch ring 155b. The resin spring 155h is located at a lower position when the switch ring 155b is located at one of the two rotating positions S and M, and at an upper position when the switch ring 155b is located between the two rotating positions S and M. The cam member 129 is provided on the holder 128, contacts the resin spring 155h, and deforms the resin spring 155h between the upper and lower positions. The cam member 129 has a pair of concaves 129a and 129b, and a convex 129c. When the resin spring 155h is located at one of the concaves 129a and 129b, the resin spring 155h is located at the lower position. When the resin spring 155h is located at the convex 129c, the resin spring 155h is located at the upper position. FIG. 4B shows that the resin spring 155h is located at the concave 129a, and this position is the lock position of the standard position S. When the resin spring 155h is located at the concave 129b, the macro switch ring 155b is located at the lock position of the macro position M.

The resin spring 155h and the switch ring 155b are made of the same resin material and integrated with each other. In addition, the cam member 129 and the holder 128 are made of the same resin material and integrated with each other. These configurations reduce the number of components rather than configuring them as separate members.

The IrDa panel 157 is used for short-distance infrared data transmissions. The battery 158 includes a battery pack as a secondary battery, and a rear cover 125 that shields and exposes it is attached detachably to the rear case 124. Screws 123a are provided under the rear cover 125, and couple the front case 122 to the rear case 124. The antenna 159 is used for communications with a base station.

A variety of components mounted on the fixed-side housing 120 may use any technology known in the art, and a detailed description thereof will be omitted.

The hinge part 130 foldably couples the movable-side housing 110 to the fixed-side housing 120, and has a divided structure.

In operation, the user uses the shooting device 155 to take still and motion pictures through various functions of the operating part 150. The switch ring 155b does not project from the rear case 124, as shown in FIG. 1D, improving the operability. In addition, the rear case 124 serves to fix the switch ring 155b, and the click means reduces the number of components by superseding the conventional flat spring.

Further, the present invention is not limited to these preferred embodiments, and various variations and modifications may be made without departing from the scope of the present invention.

Thus, the present invention can provide an electronic apparatus having a shooting device and a macro switching apparatus that reduces the number of components and improves operability.

What is claimed is:

1. An electronic apparatus comprising:
    a shooting device;
    a housing;
    a holder fixed, as a separate member from said housing, in said housing and configured to hold said shooting device in said housing;
    a switch ring rotatably engaged with said holder in said housing, said switch ring being configured to enable a focal point for photography of said shooting device to be manually switched when said switch ring is rotated; and
    a panel that is held between said switch ring and said holder in the housing serves as a transmission window, and protects a lens of said shooting device.

2. An electronic apparatus according to claim 1, wherein a top surface of said switch ring is as high as a top surface of said housing.

3. An electronic apparatus according to claim 1, wherein said electronic apparatus is a movable radio communication apparatus, and said holder holds an antenna for the movable radio communication apparatus.

4. An electronic apparatus comprising:
    a shooting device;
    a housing;
    a holder that is fixed, as a separate member from said housing, in said housing, and at least partially holds said shooting device;
    a switch ring that enables a focal point for photography of said shooting device to be manually switched when said switch ring is rotated; and
    a clicking unit that uses an engagement between said switch ring and said holder, and provides a click sense at two rotating positions of said switch ring, which correspond to two focal point positions,
    wherein said clicking unit includes:
    an elastic member that is provided at one of said switch ring and said holder, and deformable between a first position and a second position, said elastic member being located at the first position when said switch ring is located at one of the two rotating positions, and said elastic member being located at the second position when said switch ring is located between the two rotating positions; and
    a cam member that is provided at the other of said switch ring and said holder, contacts said elastic member, and deforms said elastic member between the first and second positions, and
    wherein said elastic member and said switch ring are made of the same resin material and integrated with each other.

5. An electronic apparatus comprising:
    a shooting device;
    a housing;
    a holder that is fixed, as a separate member from said housing, in said housing, and at least partially holds said shooting device;
    a switch ring that enables a focal point for photography of said shooting device to be manually switched when said switch ring is rotated; and
    a clicking unit that uses an engagement between said switch ring and said holder, and provides a click sense at two rotating positions of said switch ring, which correspond to two focal point positions,
    wherein said clicking unit includes:
    an elastic member that is provided at one of said switch ring and said holder, and deformable between a first position and a second position, said elastic member being located at the first position when said switch ring is located at one of the two rotating positions, and said elastic member being located at the second position when said switch ring is located between the two rotating positions; and
    a cam member that is provided at the other of said switch ring and said holder, contacts said elastic member, and deforms said elastic member between the first and second positions, and
    wherein said cam member and said holder are made of the same resin material and integrated with each other.

* * * * *